United States Patent
Hayashi et al.

(10) Patent No.: US 9,309,119 B2
(45) Date of Patent: Apr. 12, 2016

(54) PRODUCING METHOD OF METAL FINE PARTICLES OR METAL OXIDE FINE PARTICLES, METAL FINE PARTICLES OR METAL OXIDE FINE PARTICLES, AND METAL-CONTAINING PASTE, AND METAL FILM OR METAL OXIDE FILM

(75) Inventors: Yamato Hayashi, Sendai (JP); Yoshihiro Sekiguchi, Sendai (JP); Hirotsugu Takizawa, Sendai (JP); Dai Ishikawa, Hitachi (JP); Tomiya Abe, Hitachi (JP)

(73) Assignee: HITACHI METALS, LTD., Tokyo (JP)

(*) Notice: Subject to any disclaimer, the term of this patent is extended or adjusted under 35 U.S.C. 154(b) by 1020 days.

(21) Appl. No.: 13/069,825

(22) Filed: Mar. 23, 2011

(65) Prior Publication Data

US 2011/0233480 A1     Sep. 29, 2011

(30) Foreign Application Priority Data

Mar. 24, 2010   (JP) ................. 2010-068515

(51) Int. Cl.
| | | |
|---|---|---|
| H01B 1/02 | (2006.01) |
| B22F 9/18 | (2006.01) |
| B22F 9/04 | (2006.01) |
| B22F 1/00 | (2006.01) |
| C01B 13/14 | (2006.01) |
| C01B 13/32 | (2006.01) |
| B82Y 30/00 | (2011.01) |
| C01G 3/02 | (2006.01) |
| H01B 1/22 | (2006.01) |

(52) U.S. Cl.
CPC ............. *C01B 13/322* (2013.01); *B22F 1/0014* (2013.01); *B22F 9/04* (2013.01); *B22F 9/18* (2013.01); *B82Y 30/00* (2013.01); *C01G 3/02* (2013.01); *H01B 1/026* (2013.01); *H01B 1/22* (2013.01); *C01P 2002/72* (2013.01); *C01P 2004/03* (2013.01); *C01P 2004/04* (2013.01); *C01P 2004/51* (2013.01); *C01P 2004/64* (2013.01)

(58) Field of Classification Search
CPC ............ H01B 1/02; H01B 1/026; H01B 1/22; B82Y 30/00; B82Y 40/00; B22F 1/0014; B22F 1/0018; B22F 9/00; B22F 9/04; B22F 9/18; B22F 9/24; C01P 2004/64; C01P 2004/51; C01B 13/322; C01G 1/02; C01G 3/02

USPC ......... 252/500, 512, 518.1; 75/300, 343, 345, 75/354; 423/592.1
See application file for complete search history.

(56) References Cited

U.S. PATENT DOCUMENTS

| | | |
|---|---|---|
| 5,776,264 A | 7/1998 | McCandlish et al. |
| 2006/0049547 A1 | 3/2006 | Khang |
| 2007/0018140 A1 | 1/2007 | Lee et al. |

FOREIGN PATENT DOCUMENTS

| | | | | |
|---|---|---|---|---|
| JP | 62270707 | | 11/1987 | |
| JP | 02038505 A | * | 2/1990 | ............... B22F 9/22 |
| JP | 02038505 | | 7/1990 | |
| JP | 3034211 A | | 2/1991 | |
| JP | 04325608 | | 11/1992 | |
| JP | 2561537 B2 | | 9/1996 | |
| JP | 09309704 | | 12/1997 | |
| JP | 2000226601 | | 8/2000 | |
| JP | 2005-177983 A | | 7/2005 | |
| JP | 2005-211730 A | | 8/2005 | |
| JP | 2006-307341 A | | 11/2006 | |
| JP | 2007-31835 A | | 2/2007 | |
| JP | 2007-063580 A | | 3/2007 | |
| JP | 2008 024968 | * | 2/2008 | |
| JP | 2008024968 | | 2/2008 | |
| JP | 2008223061 | | 9/2008 | |
| JP | 2009149918 | | 7/2009 | |

OTHER PUBLICATIONS

Office Action issued on Nov. 19, 2013 in corresponding Japanese application (2010-068515) with English abstract.
Ming-Shin Yeh, et al. "Formation and Carasteritics of Cu Colloids from CuO Powder by Laser Irradiation in 2-Propanol" j.phys.Chem. B, 103, Am. Chem. Soc. (1999) p. 6851-6857.
Kazuhiro Sekiguchi, "Synthesis and evaluation of Cu particles by chemical top-down process"—Mar. 2011, pp. 27-31 (Tohoku University master's thesis).

* cited by examiner

*Primary Examiner* — Tanisha Diggs
(74) *Attorney, Agent, or Firm* — Paul D. Bianco; Fleit Gibbons Gutman Bongini & Bianco PL

(57) ABSTRACT

There is provided a producing method of metal fine particles or metal oxide fine particles for producing metal fine particles or metal oxide fine particles by atomizing raw materials by performing processes including an oxidizing process and a reducing process to the raw materials composed of metal or a metal compound.

5 Claims, 6 Drawing Sheets

RAW MATERIAL
Cu

AFTER FIVE TIMES
REDUCTION

PRODUCING METHOD OF METAL FINE PARTICLES OR METAL OXIDE FINE PARTICLES, METAL FINE PARTICLES OR METAL OXIDE FINE PARTICLES, AND METAL-CONTAINING PASTE, AND METAL FILM OR METAL OXIDE FILM

The present application is based on Japanese Patent Application No. 2010-068515, filed on Mar. 24, 2010, the entire contents of which are hereby incorporated by reference.

BACKGROUND OF THE INVENTION

1. Field of the Invention

The present invention relates to a producing method of metal fine particles or metal oxide fine particles, metal fine particles or metal oxide fine particles, and a metal-containing paste, and a metal film or a metal oxide film. The metal fine particles and the metal oxide fine particles produced by the present invention are used for forming an electronic circuit and forming an electroconductive film in electronic materials, solder materials, forming a wire shielding layer, catalyst materials, and ceramic sintered compacts, etc.

2. Description of the Related Art

The metal fine particles and the metal oxide fine particles have high surface activity and therefore receive an attention as functional materials, and its application to various industrial fields is expected. Here, a fine particle means a particle with a particle size of about 1 nm to 1000 nm.

However, conventional metal fine particles involve a problem such as a high cost under limitation in its production process by synthesis. The metal fine particles are produced by a physical method or a chemical method.

The physical method is a method of producing the metal fine particles by heating and vaporizing metal or a metal compound in an apparatus such as a vacuum chamber and adjusting a degree of supersaturation of metal vapor. For example, patent documents 1 to 3 disclose a technique of synthesizing inorganic fine particles or metal fine particles with high purity by the physical method.

The chemical method is a technique of producing the metal fine particles by reducing metal ions or metal complex in a solution, and making a nucleus of a metal atom grow little by little. For example, patent documents 4 and 5 disclose a technique of synthesizing fine particles by using a reducing agent, with a carbonyl compound, being an organic metal compound, as a metal source. Further, patent document 6 discloses a technique of synthesizing the metal fine particles by using metal salts such as nitrate salt, sulfate salt, carbonate, and chloride, as metal sources.

Patent document 1: Japanese Patent Laid Open Publication No. 2005-177983
Patent document 2: Japanese Patent Laid Open Publication No. 2005-211730
Patent document 3: Patent Publication No. 2561537
Patent document 4: Japanese Patent Laid Open Publication No. 2007-31835
Patent document 5: Japanese Patent Laid Open Publication No. 2007-63580
Patent document 6: Japanese Patent Laid Open Publication No. 2006-307341

However, the production of the metal fine particles by the aforementioned physical method has a problem that a large apparatus such as a vacuum chamber is used involving a high cost with low throughput, thus requiring an extremely high production cost.

Further, the production of the metal fine particles by the aforementioned chemical method has a problem that an environmental load is great as the producing method, because of a high cost of a raw material and because lots of raw materials are toxic materials. Specifically, in the producing method disclosed in the patent documents 4 and 5, although the organic metal compound such as a metal carbonyl compound is used as a raw material, lots of organic metal compounds are toxic materials and expensive. Further, in the producing method disclosed in the patent document 6, although the metal salt is used as the raw material, metal salts such as nitrate salt, sulfate salt, carbonate, and chloride are also toxic materials, and anions (nitrate ion, sulfate ion, carbonate ion, and chloride ion, etc.,), which are derived from a raw material, is remained in a solution after producing the fine particles, thus requiring a step of desalting is required. Further, in order to produce fine particles with uniform particle sizes, such fine particles need to be produced by a diluted solution, thus requiring a large quantity of solvent and accordingly requiring a treatment to a large quantity of waste liquid.

BRIEF SUMMARY OF THE INVENTION

Therefore, an object of the present invention is to provide a producing method of metal fine particles or metal oxide fine particles capable of producing the metal fine particles or the metal oxide fine particles at a low cost and under a low environmental load, the metal fine particles or the metal oxide fine particles, and a metal-containing paste, and a metal film or a metal oxide film.

A first aspect of the present invention provides a producing method of metal fine particles or metal oxide fine particles: comprising an oxidizing process and a reducing process performed to raw materials composed of metal or a metal compound, to thereby atomize the raw materials and produce metal fine particles or metal oxide fine particles.

Another aspect of the present invention provides metal fine particles or metal oxide fine particles obtained by using the producing method of the metal fine particles or the metal oxide fine particles.

Another aspect of the present invention provides a metal-containing paste including metal fine particles or metal oxide fine particles produced by the producing method of the metal fine particles or the metal oxide fine particles, and a solvent composition.

Another aspect of the present invention provides a metal film or a metal oxide film obtained by coating and sintering of the metal-containing paste.

DETAILED DESCRIPTION OF THE INVENTION

Figure 1:
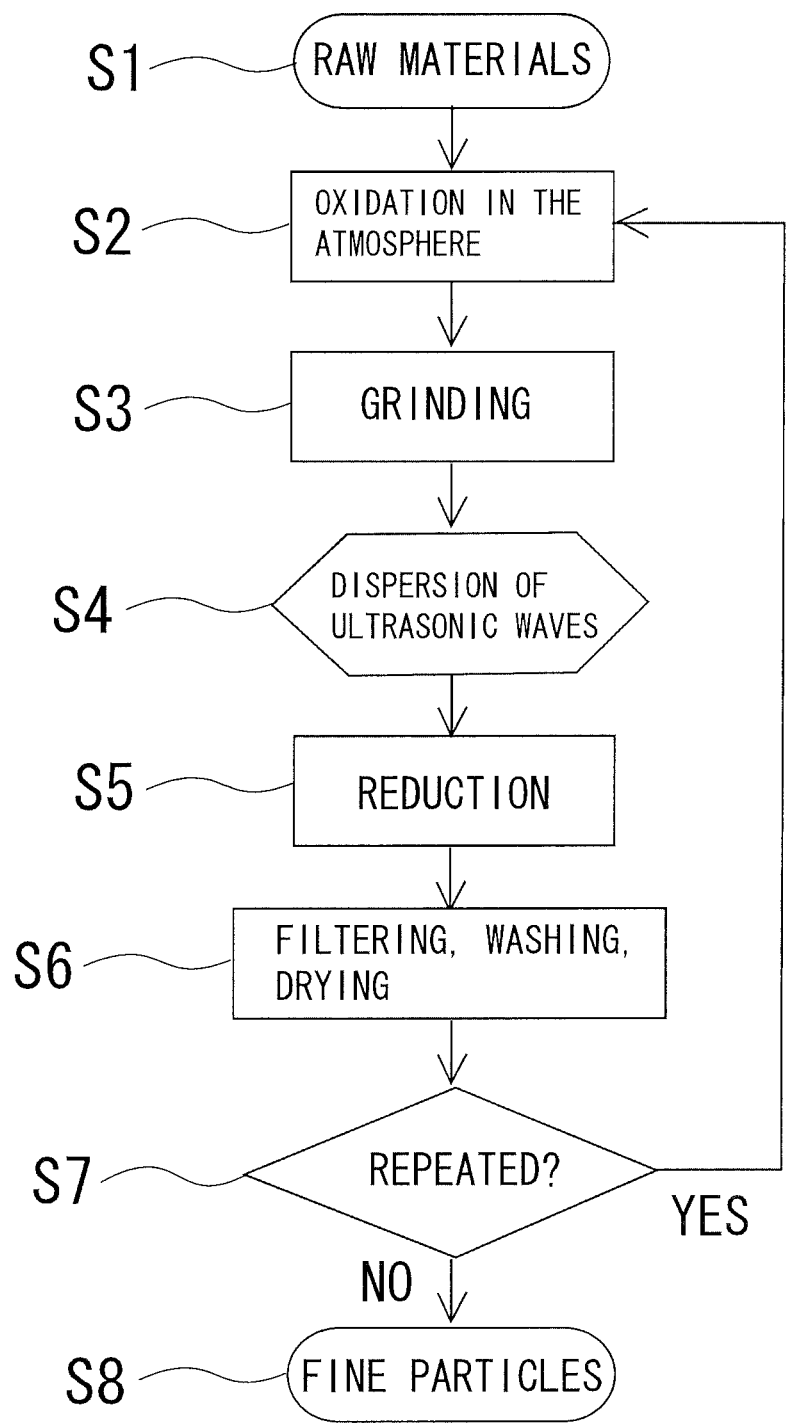
FIG. 1 is a flow chart showing producing steps of a producing method of metal fine particles according to an example 1 of the present invention.

A producing method of metal fine particles or metal oxide fine particles according to an embodiment of the present invention will be described hereafter.

A new fact is found by inventors of the present invention, such that by using metal or a metal compound as a raw material (metal source), and by applying an oxidation treatment and a reduction treatment to the raw material, the raw material is atomized. Thus, after strenuous efforts of the inventors of the present invention, the present invention is completed.

The producing method of the metal fine particles or the metal oxide fine particles according to an embodiment of the present invention can be described as follows.

Metal or a metal compound is used as a raw material, and in a solid-gas system or a solid-liquid system, the raw material is oxidized and reduced, and ground after oxidation as needed. By repeating such a series of processes once or multiple number of times, the raw material (including an intermediate product generated through the oxidizing process or the reducing process of once or more) is atomized, and if a final process (the oxidizing process and the reducing process) is ended by the oxidizing process, metal oxide fine particles can be obtained, and if the final process is ended by the reducing process, metal fine particles can be obtained.

The producing method of the metal fine particles or the metal oxide fine particles according to an embodiment of the present invention is a top-down type process in which a solid-gas reaction between a metal source (solid) and gas, or a solid-liquid reaction between a metal source (solid) and liquid is utilized, and a large block metal source (inexpensive bulk metal material, powdery metal material, and granular metal material) compared with target metal or metal oxide fine particles, is atomized into fine particles by a general process.

In atomizing the metal source, use of an expensive apparatus is inevitable in a conventional physical method (homogeneous vapor-phase reaction, gas-gas reaction). However, according to this embodiment, such an apparatus is not required and therefore production at a low cost is achieved. Further, a chemical reaction in this embodiment is a heterogeneous reaction such as solid-gas reaction and solid-liquid reaction. Therefore, a problem of a conventional chemical method (ion reaction in a homogeneous liquid phase system), such as residual anion, and generation of large quantities of waste liquid caused by a diluted synthesis concentration, can be solved.

As the raw material (metal source) used in this embodiment, metal or a metal compound can be used, and it is sufficient if the metal of target metal fine particles or metal oxide fine particles is contained. As the metal of the metal fine particles or the metal oxide fine particles, Mg, Al, Sc, Ti, V, Cr, Mn, Fe, Co, Ni, Cu, Zn, Y, Zr, Nb, Mo, Tc, Ru, Rh, Pd, Ag, Cd, In, Sn, Hf, Ta, W, Re, Os, Ir, Pt, Au, etc., can be given, or an alloy composed of such metallic species may be used. As the metal source, pure metal, metal oxide, metal salt, and an organic metal compound can be given. Then, by using any one of them, the metal oxide can be obtained by the oxidizing process. Further, a solution, in which metal ions exist, can also be the raw material, if the metal oxide is obtained by the oxidizing process. In addition, a mixture of mixing two kinds or more of pure metal, metal oxide, metal salt, organic metal compound and metal ion solutions, can also be utilized. As a desired raw material, pure metal and the metal oxide can be given as an inexpensive metal source with harmless decomposed products. As a form of the raw material, a bulk body or powdery state can be used. However, in order to improve a reaction rate of oxidation and reduction, a large specific area is desirable, and a particle or powder having a size of about 1 to 100 μm, or a film state with a thickness of about 1 to 100 μm is further desirable.

An atomizing mechanism of the raw material according to this embodiment will be described as follows.

By repeating oxidation and reduction of the raw material in the solid-gas system or in the solid-liquid system, the raw material is gradually atomized and formed into a powdery shape. Such an atomizing of the raw material occurs by an overlap of a plurality of complicated phenomena, and specifically it can be considered that the atomizing of the raw material occurs due to thermal expansion and contraction of raw material particles, generation of cracks inside of grains and on grain boundaries of the raw material particles, generation of gas from the raw material, and heterogeneousness of a composition of the raw material particles, etc. In the oxidizing process, volume expansion occurs in a process from metal to metal oxide, and when oxidation is not completely performed, the composition becomes heterogeneous. In a process of becoming metal oxide, the generation of cracks inside of grains and on grain boundaries or a fragile breakage, etc., occurs easily. In the reducing process, in a process from metal oxide to metal, volume contraction occurs, and further oxygen gas is generated, and dissolution and re-precipitation occurs. By repeatedly performing the oxidizing process and the reducing process, metal fine particles or metal oxide fine particles are generated. Although an atomizing process is advanced only by repeating the oxidation and reduction, atomizing of the fine particles is further remarkable by performing a process of grinding the metal oxide, being a product, after the oxidizing process, and thereafter performing the reducing process.

The oxidizing or reducing process according to this embodiment can be performed in the solid-gas system or in the solid-liquid system.

The oxidation or reduction in the solid-gas system, is performed in the atmosphere, under exchange of prescribed gas atmosphere, or in a vacuum state of the atmosphere or prescribed gas atmosphere. In order to produce an intermediate product, it is preferably performed in an atmosphere of accelerating the atomizing of the fine particles, and for example, metal oxidation, metal nitridation, or metal hydridation, etc., is performed. More specifically, it is performed in the atmosphere, or in the atmosphere of oxygen, nitrogen, argon, or hydrogen, etc., or in a vacuum state, at a temperature set in a range of 100 to 1500° C. Thus, grinding efficiency thereafter is improved, and further fine product can be obtained. The temperature required for oxidation reaction or reducing reaction, is preferably set to be low, for the purpose of suppressing an agglomeration of the fine particles.

The oxidation or reduction in the solid-liquid system is performed in such a manner that an oxidizing agent or a reducing agent is added, or a protective agent are added as needed, in a state that the raw material is dispersed into water or an organic solvent, or a mixture of the water and the organic solvent, then energy such as heat energy and electromagnetic wave energy is added to accelerate the atomizing and powdering of the raw material, and the metal fine particles or the metal oxide fine particles are finally obtained. A heating method may comply with a publicly-known method. When an energy source is the electromagnetic wave, particularly laser beams or microwaves are suitably used. When such energy is added to the solid-liquid system in which the raw material (solid) and the solvent (liquid) are mixed, response is different between the solid and the liquid. More specifically, an instantaneous temperature gradient is generated between both of them, due to a difference in absorbing the energy between the solid and the liquid. This means that the temperature of the raw material rises rapidly, the raw material being in a powdery state and being a solid state, thereby advantageously acting on the atomizing of the raw material. The oxidizing reaction and the reducing reaction mainly occur in the solid-liquid system of this embodiment, as a direct oxidizing reaction and a direct reducing reaction. Also, it can be considered that a dissolving and reducing re-precipitation reaction or dissolving oxidizing re-precipitation reaction secondarily occurs microscopically on the surface of a solid fine particle. However, when a heat source such as laser or microwaves is used, grain growth hardly occurs regarding the fine particles which are precipitated from the surface of the solid fine particles, due to instantaneous temperature rise and cooling processes of the solid fine particles, and there is an effect that further finer fine particles can be obtained. In a case of a heat source or a reaction environment capable of effectively performing rapid heating or rapid cooling or both of them, the heat source is not limited to the laser or microwaves. Further, although there is no theoretically established evidence, if the heat source such as laser or microwaves is used, the thermal expansion or contraction of a solid body, the generation of cracks inside of the grain or on the grain boundaries within the solid body, and a heterogeneous state of the solid body occur easily, and there is an effect that finer fine particles can be obtained even by a direct reducing reaction of the solid particles.

The solvent or the protective agent used in this embodiment may be added before charging the energy such as heat or electromagnetic waves, or may be added in a middle of charging the energy. The reaction rate and the particle size can be controlled by a combination of the used solvent and the protective agent, or a timing of addition thereof. Further, a reaction temperature in the solid-liquid system is preferably set to 0° C. to 250° C. in either case of the oxidizing reaction and the reducing reaction. Although depending on the combination of the used solvent and the oxidizing agent or reducing agent, there is a possibility that a progress of the oxidizing reaction and the reducing reaction is remarkably slow at a low temperature of less than 0° C. Meanwhile, in a case of a high temperature exceeding 250° C., the agglomeration of particles is easily progressed, thus posing a problem that efficient atomizing is inhibited.

As the reducing agent and the oxidizing agent that can be used in this embodiment, generally used inorganic compound or organic compound can be used. For example, as the reducing agent, inorganic compounds such as dissolved hydrogen, hydrazine, and sodium borohydride, and organic compounds such as alcohols including methanol, ethanol, 2-propanol, 1,2-ethanediol, aldehydes such as formaldehyde and acetaldehyde, and carboxylic acids such as formic acid, acetic acid, oxalic acid, citric acid, and ascorbic acid, can be utilized. Organic acid, being the reducing agent, does not contain anion which requires desalting, and accelerates the re-precipitation of a solid-liquid reduction and a dissolving reduction of the metal and the metal oxide, and therefore is effective in an aspect of reaction and environment.

As the oxidizing agent, inorganic compounds, etc., such as dissolving oxygen and hydrogen peroxide, dichromate, and permanganate, etc., can be given. Particularly, the oxidizing agent which does not excessively accelerate ionization of the raw material fine particles, and causes oxidizing reaction at a suitable speed, and does not allow ions that can be toxic substances or impurities, to be remained in the solution, is suitable and the hydrogen peroxide can be suitably used.

Further, as the organic solvent, a reductive solvent and a non-reductive solvent can be combined and used. By not only selecting the solvent, but also adjusting the ratio of the reductive solvent and the non-reductive solvent, the reaction rate of the oxidizing reaction and the reducing reaction can be controlled, and a size of the generated particle can be controlled. Further, the reaction rate of the oxidizing reaction and the reducing reaction can also be controlled by adjusting the combination or ratio of the organic solvent, and the oxidizing agent and the reducing agent, and the size of the generated particle can be controlled. Further, when the protective agent is used, the particle is easily coated with the protective agent by mixing a good solvent into the protective agent, thus making it possible to control a degree of coating. The reaction can be caused not only in the organic solvent but also in a water system, and the reaction can also be caused in a solvent in which the organic solvent and water are mixed. The particle size can also be controlled by adjusting the ratio of the organic solvent and water.

As the reductive solvent, alcohols such as ethanol, methanol, isopropyl alcohol, 2-ethyl hexyl alcohol, and aldehydes such as acetaldehyde, and polyols such as glycol, etc., are preferable, and as the non-reductive solvent, toluene, hexane, cyclohexane, xylene, and benzene, etc., can be used.

A metal concentration when the raw material is added to the solution (liquid obtained by adding the oxidizing agent, reducing agent, or protective agent as needed, to the organic solvent or water) is preferably set in a range of 0.01 to 10 mol/L, and is further preferably set in a range of 0.05 to 3 mol/L. In a case of less than 0.01 mol/L, a production with a diluted concentration leads to a deterioration of throughput, thus involving a problem that a production cost rises. Meanwhile, in a case of a concentration exceeding 10 mol/L, the agglomeration of the produced metal fine particles is likely to occur.

According to this embodiment, the metal fine particles and the metal oxide fine particles with particle size of 500 nm or less can be produced, even if not adding a compound group called the protective agent that functions as coating the surface of each metal fine particle. Further, the protective agent can also be added as needed, for the purpose of producing further fine particles. By adding the protective agent, it may be possible to not only suppress the agglomeration of the fine particles, but also suppress the change of properties such as oxidation of the metal fine particles, and improve dispersability in the solvent. As the protective agent, organic materials such as polyvinyl alcohol, and amines such as polyvinyl pyrolidone, are given as examples. Not only non-ion base materials but also an ion-based surface active agent can be used.

If an addition amount of the protective agent is increased, there is a problem that an amount of a waste liquid is also increased. Therefore, 50 wt % or less of the protective agent by a weight ratio of metal is preferably added. By adjusting conditions of adding the protective agent, the particle size of the metal fine particles and the metal oxide fine particles can be controlled in a range of 0.5 nm to 100 µm. Further, it may be also possible to make a form in which fine particles are mixed, with different particle size distributions. Further, the shape of the generated fine particle can be controlled, and spherical, polygonal, and plate-shaped fine particles can be obtained.

The metal fine particles or the metal oxide fine particles produced by the producing method of the metal fine particles or the metal oxide fine particles of this embodiment, and a solvent composition are mixed, to thereby produce a metal-containing paste (electroconductive metal paste (metal paste) or metal oxide paste). Further, a metal film can be formed by coating or printing of the electroconductive metal paste over an object such as a wiring substrate or electric wire, and thereafter sintering the electroconductive metal paste. Further, the metal oxide film can also be formed by using the metal oxide paste similarly to the electroconductive metal paste.

In the metal paste using the metal fine particles of this embodiment, the kind of the usable solvent composition can be selected from a group consisting of water, alcohols, aldehydes, amines, thiols, monosaccharides, polysaccharides, straight-chain hydrogen carbides, aliphatic acids, and aromatic series, and a plurality of solvents can also be used by being combined. Preferably, the solvent having affinity for the protective agent that covers the metal fine particles is selected. In addition, the solvent is preferably a low polar solvent or a non-polar solvent having a relatively high boiling point, in which the electroconductive metal paste is adjusted to a proper viscosity possible to be used for coating, and which is not easily evaporated at a room temperature. More specifically, hydrogen carbide of normal having 10-16 C, toluene, xylene, 1-decanol, terpineol, etc., are suitably used. Further, slight quantities of wax or resin can also be added into the solvent, for the purpose of adjusting a moldability and viscosity of the electroconductive paste.

The metal fine particles according to this embodiment have low quantities of impurities such as residual ions, excellent in catalytic activity and sinterability, and are capable of forming the metal film with high purity. Basic properties of the metal film, such as a volume resistance and reflectance, density, etc., are also excellent.

In the metal oxide paste using the metal oxide fine particles of this embodiment, the solvent composition can also be used similarly to the metal fine particles. The metal oxide fine particles of the present invention have low quantities of impurities such as residual ions, excellent in catalytic activity and sinterability, and capable of forming the metal oxide film with high purity. Basic properties of the metal oxide film, such as hardness and strength, density, etc., are also excellent. Further, applicative properties derived from the metal oxide, such as catalytic activity, are also excellent.

According to the producing method of this embodiment, there is no necessity of introducing an expensive apparatus or performing concentration or desalting of the product, thus making it possible to produce the metal fine particles or the metal oxide fine particles with high purity by an inexpensive process. Further, waste products can be suppressed to minimum, and the metal fine particles or the metal oxide fine particles can be produced with high concentration and high dispersion, at a low cost and safely. Further, the metal fine particles and the metal oxide fine particles obtained by this embodiment have small quantities of impurities such as residual ions, and have more excellent sinterability than particles obtained by a conventional technique. Therefore, the metal fine particles or the metal oxide fine particles produced by this embodiment are expected to be utilized in various fields such as an electronic packaging field or a catalyst field, and a sintered material field.

EXAMPLES

Examples of the present invention will be specifically described hereafter. The present invention is not limited to these examples.

Measurement of physicality and a particle size in each example was executed as follows.
(1) Qualitative Analysis Phase identification of a product was performed by using a powder X-ray diffractometer "RINT-2000 PC-type CuKα ray" by Rigaku Corporation.
(2) Particle Observation and Particle Size Distribution Measurement Products were dispersed into ethanol by ultrasonic waves, and the ethanol was dropped on a gold-sputtered glass plate. After the glass plate was dried, it was attached to a surface of an observation stage by carbon tape, which was then observed by a Field Emission Scanning Electron Microscope (FE-SEM) "JSM-6500F" by JEOL Ltd. An observed particle image was directly measured by calipers (by Mitutoyo Ltd.). Particle sizes of about 100 to 200 particles per one sample were measured, to thereby calculate an average particle size (calculation average of the particle size).

FIG. 1 shows a flowchart of the producing method of copper fine particles according to example 1.
(Oxidizing Process)

Copper particles by SOEKAWA CHEMICAL CO., LTD. (purity: 99.99%, average particle size: 3 µm) were prepared as raw materials (starting materials) (Step 1 S1). 0.1 mol of the copper fine particles was put in an alumina crucible, then a temperature was raised up to 500° C. at a rate of 10° C./minute in the atmosphere, which was then maintained for 30 minutes at 500° C., to thereby perform oxidation of the copper particles (S2).
(Grinding Process)

Figure 2:
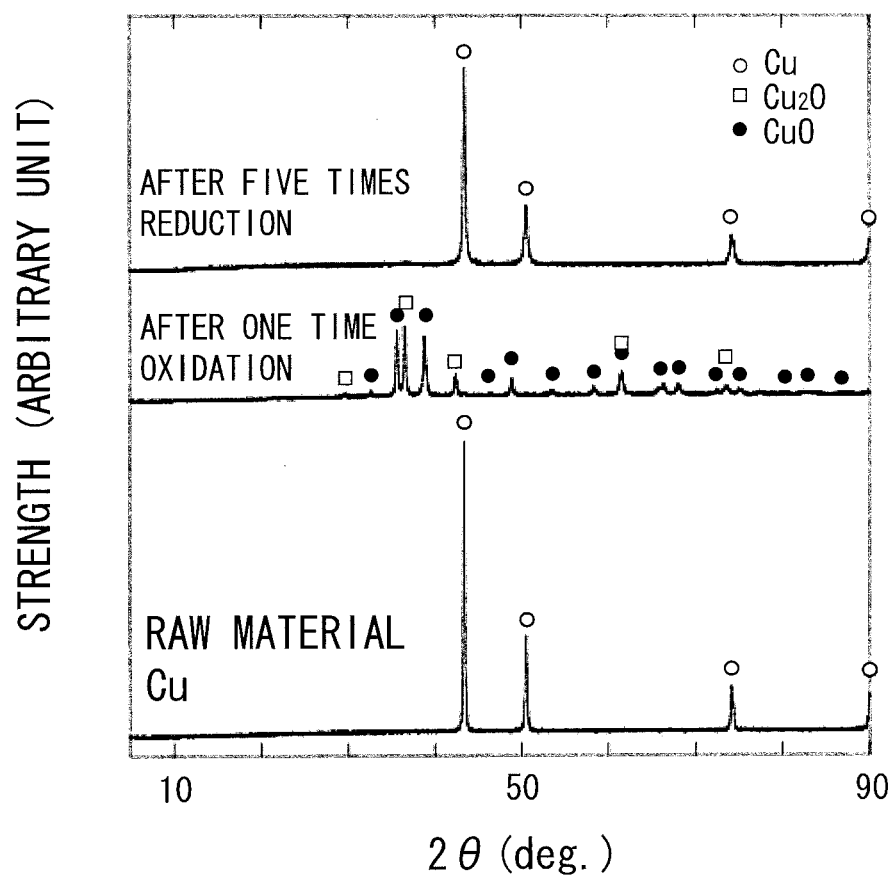
FIG. 2 is a view showing an X-ray diffraction pattern of a raw material and a product of the example 1 of the present invention.

Next, a sintered compact obtained by the aforementioned oxidizing process was ground for 15 minutes by an alumina mortar (S3). FIG. 2 shows results of the phase identification by an X-ray diffraction pattern of the product after one time oxidation. FIG. 2 also shows the X-ray diffraction pattern of the copper particles as the raw materials. It was found that the product after one time oxidation was a mixture of copper (I) oxide ($Cu_2O$) and copper (II) oxide (CuO).
(Reducing Process)

The product (mixture of copper (I) oxide and copper (II) oxide) obtained by the aforementioned grinding process and 100 ml of 2-propanol, were put in a conical flask of 300 ml, which were then irradiated with ultrasonic waves, to thereby obtain a suspension (S4). The suspension was moved to a three neck flask of 300 ml, and 0.1 mol of hydrazine hydrate was added thereto, which was then irradiated with microwaves of 2.45 GHz for 1 hour by using a microwave heating apparatus "µ reactor" by Shikoku Instrumentation Co., Ltd., so that a temperature of a solution was fixed at 80° C. (S5). The product was recovered by filtering, and was washed by using ethanol, and was dried by being left to stand for several hours in the atmosphere, to thereby obtain a powdery product (S6).
(Repetition of the Oxidizing Process, Grinding Process, And Reducing Process)

The powdery product obtained by the aforementioned reducing process was put in the alumina crucible again, and was oxidized under conditions similar to those of the oxidizing process. An obtained product of copper oxide was ground by the alumina mortar, to thereby perform reduction under conditions similar to those of the reducing process. Thereafter, the oxidizing process, the grinding process, and the reducing process were set as one cycle, and 5 cycles were repeated (S7), to thereby obtain a product (S8).

(Final Product)

Figure 3A:
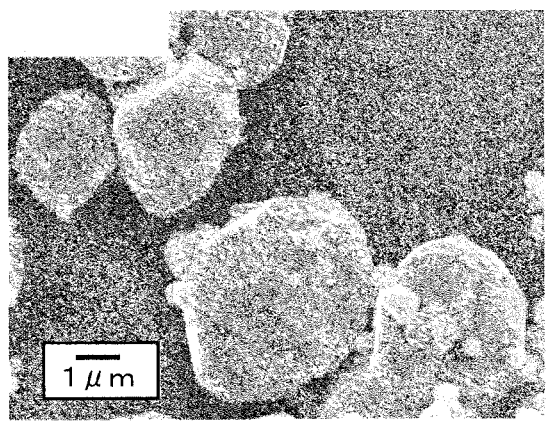
FIG. 3A is an image showing an observation result of the raw material of the example 1 of the present invention by using a Field Emission Scanning Electron Microscope (FE-SEM).
Figure 3B:
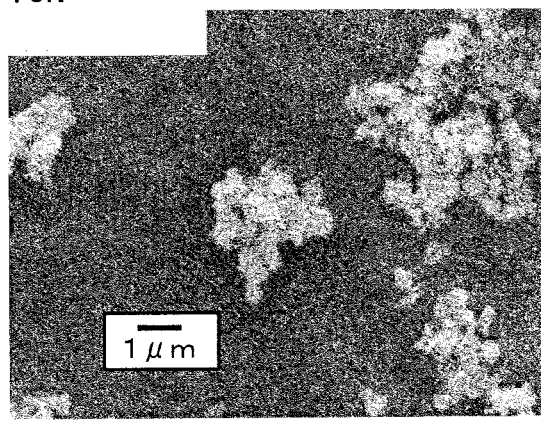
FIG. 3B is an image showing an observation result of the product of the example 1 of the present invention by using the Field Emission Scanning Electron Microscope (FE-SEM).
Figure 4:
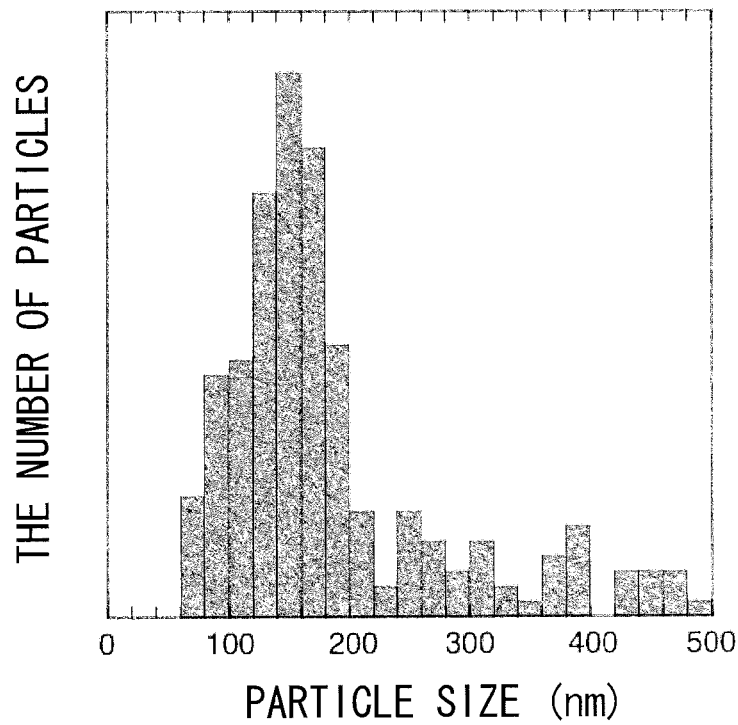
FIG. 4 is a graph showing a particle size distribution of the metal fine particles generated by the example 1 of the present invention.

The X-ray diffraction pattern of the product obtained by fifth reduction is shown in FIG. 2. It was found from FIG. 2, that the product was reduced to metal copper. When formula of Scherrer was applied to a diffraction peak of (111) plane, (200) plane, and (220) plane, with constant K defined as K=0.9, it was found that the crystalline diameter was reduced every time the reduction was repeated, and the crystalline diameter of Cu particle obtained by the fifth reduction was 37.6 nm, with respect to the crystalline diameter 57.4 nm of the Cu particle as the raw material. FE-SEM image of the raw material and the product after fifth reduction is shown in FIG. 3. It was confirmed from this image, that the Cu particle (FIG. 3A) of the raw material with average particle size of 3 μm was atomized, to become Cu fine particle (FIG. 3B). When the particle size distribution of this product was measured, it was found that measurement results were obtained as shown in FIG. 4, and the average particle size was 187 nm.

Example 2

In example 2, copper fine particles were produced as final products, by using copper (II) oxide particles as the raw materials (starting raw materials).

(Reducing Process)

100 ml of 2-propanol was put in a conical flask of 300 ml, and 0.1 mol of copper (II) oxide particles (purity: 99%, average particle size: 1-2 μm) by KOJUNDO CHEMICAL LABORATORY CO., LTD. was added, which were then dispersed by ultrasonic waves. An obtained suspension was moved to a three neck flask of 300 ml, and 0.1 mol of hydrazine hydrate was added thereto, which was then irradiated with microwaves of 2.45 GHz for 1 hour by using a microwave heating apparatus "μ reactor" by Shikoku Instrumentation Co., Ltd., so that a temperature of a solution was fixed at 70° C. The product was recovered by filtering, and was washed by using ethanol, and was dried by being left to stand for several hours in the atmosphere, to thereby obtain a powdery product.

(Oxidizing Process and Grinding Process)

The powdery product obtained by the aforementioned reducing process was put in the alumina crucible again, and was oxidized under conditions similar to those of the oxidizing process of the example 1. The obtained copper oxide was ground by the alumina mortar under conditions similar to those of the grinding process of the example 1.

(Final Product)

Figure 5:
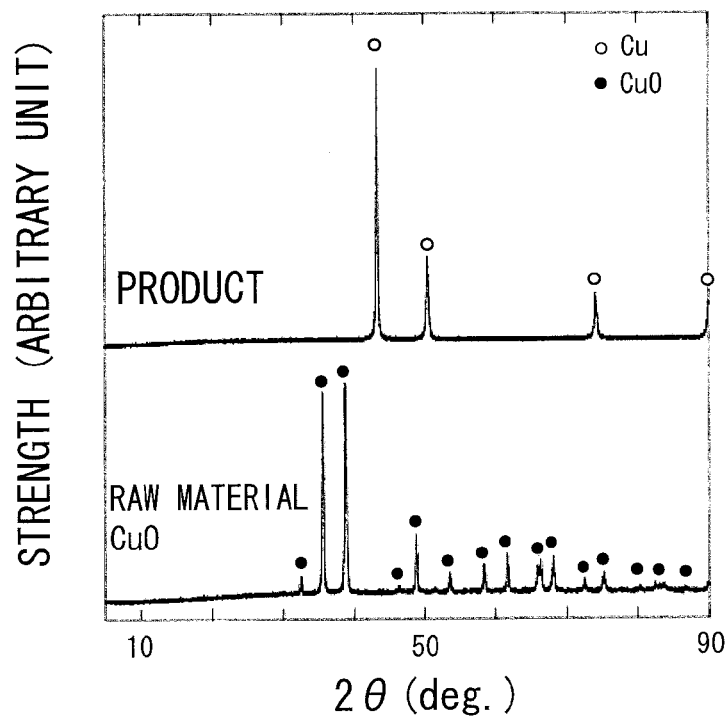
FIG. 5 is a view showing an X-ray diffraction pattern of a raw material and a product of example 2 of the present invention.
Figure 6A:
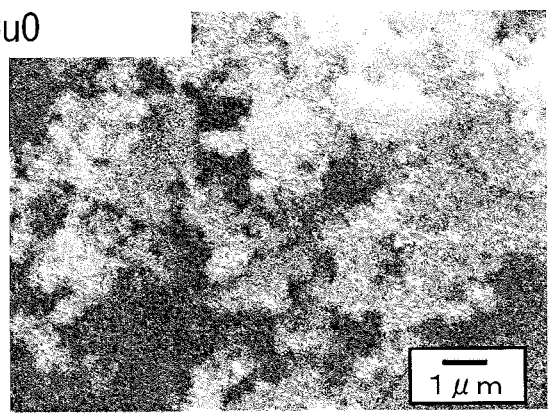
FIG. 6A is an image showing an observation result of the raw material of the example 2 by using FE-SEM.
Figure 6B:
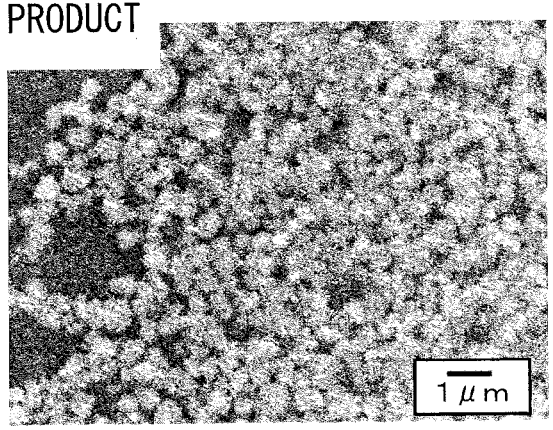
FIG. 6B is an image showing an observation result of the product of the example 2 of the present invention by FE-SEM.
Figure 7:
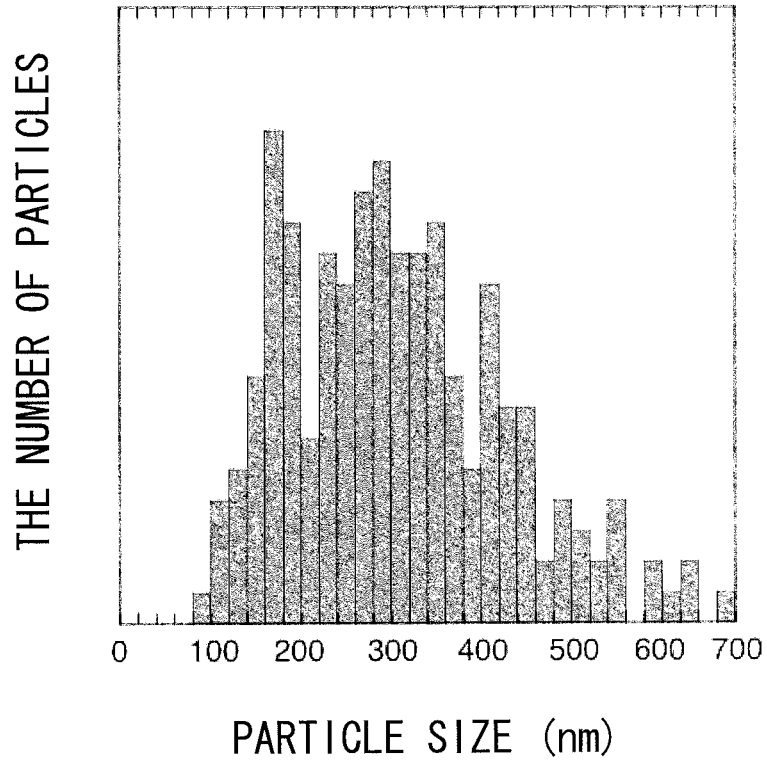
FIG. 7 is a graph showing a particle size distribution of the metal fine particles generated by the example 2 of the present invention.

The product of powdery copper oxide obtained by the aforementioned grinding process was subjected to a second reducing process, to thereby obtain copper fine particles as final products. The X-ray diffraction pattern of the product obtained by the final second reducing process is shown in FIG. 5. The copper oxide was completely reduced, to become metal copper. Further, FIG. 5 also shows the X-ray diffraction pattern of the copper (II) oxide particles as the raw materials. When the formula of Scherrer was applied to the diffraction peak of (111) plane, (200) plane, and (220) plane, with constant K defined as K=0.9, it was found that the crystalline diameter of the product was 39.1 nm, with respect to the crystalline diameter 40.6 nm of the CuO particle as the raw material. FIG. 6A shows the FE-SEM image of the raw material CuO, and FIG. 6B shows the FE-SEM image of the product, respectively. FIG. 7 shows measurement results of the particle size distribution of the product measured from the image of FIG. 6B. The average particle size of the product was 307.5 nm.

What is claimed is:

1. A producing method of metal fine particles, comprising atomizing raw materials composed of copper and producing metal fine particles by repeating a cycle multiple times, the cycle comprising:
   an oxidizing process of producing a metal oxide by oxidizing the raw materials;
   a grinding process of grinding the metal oxide after the oxidizing process; and
   a reducing process of reducing the metal oxide in a liquid solvent by
      adding the metal oxide subjected to the grinding process in the liquid solvent,
      dispersing the metal oxide in the liquid solvent by irradiating the liquid solvent with ultrasonic waves, thereafter
      irradiating the liquid solvent with microwaves of 2.45 GHz, to thereby set a temperature of the liquid solvent to 80° C., thereafter
      irradiating the liquid solvent with microwaves of 2.45 GHz for 1 hour.

2. The producing method of metal fine particles according to claim 1, wherein when raw materials are added to the liquid solvent having a reducing force in the reducing process, a concentration of the raw materials in the liquid solvent is in a range of 0.01 mol/L to 10 mol/L.

3. The producing method of metal fine particles according to claim 1, wherein the oxidizing process is performed to raw materials, which are set in a solid state, in a liquid phase, or in a gas phase having an oxidizing force.

4. The producing method of metal fine particles according to claim 1, wherein the raw materials are particle-shaped or powder-shaped pure metal.

5. A producing method of metal fine particles, comprising:
   a first reducing process of adding raw materials composed of CuO in a liquid solvent, and irradiating the liquid solvent with ultrasonic waves to disperse the CuO in the liquid solvent, and thereafter irradiating the liquid solvent with microwaves of 2.45 GHz to set a temperature of the liquid solvent to 70° C., and thereafter irradiating the liquid solvent with microwaves of 2.45 GHz for 1 hour to reduce the CuO in the solvent, to thereby obtain a product of Cu;
   an oxidizing process of oxidizing the product of Cu to obtain a product of a copper oxide;
   a grinding process of grinding the product of copper oxide after the oxidizing process; and
   a second reducing process of adding the product of the copper oxide subjected to the grinding process, into a liquid solvent, then irradiating the liquid solvent with ultrasonic waves to disperse the product of the copper oxide in the liquid solvent, and thereafter irradiating the liquid solvent with microwaves of 2.45 GHz to set a temperature of the solvent to 70° C., and thereafter irradiating the liquid solvent with microwaves of 2.45 GHz for 1 hour to reduce the product of the copper oxide in the liquid solvent,
   wherein after the first reducing process is performed, the oxidizing process, the grinding process, and the second reducing process are repeated multiple times, to thereby atomize the raw materials and produce metal fine particles.

* * * * *

UNITED STATES PATENT AND TRADEMARK OFFICE
CERTIFICATE OF CORRECTION

Page 1 of 1

PATENT NO. : 9,309,119 B2
APPLICATION NO. : 13/069825
DATED : April 12, 2016
INVENTOR(S) : Hayashi et al.

It is certified that error appears in the above-identified patent and that said Letters Patent is hereby corrected as shown below:

Add the second Assignee as follows:

(73) Assignee: TOHOKU UNIVERSITY, Sendai-Shi Miyagi, Japan (JP)

Signed and Sealed this
Twenty-eighth Day of June, 2016

Michelle K. Lee
*Director of the United States Patent and Trademark Office*